Jan. 13, 1953      E. D. LYTLE      2,625,660
ELECTRIC-HYDRAULIC POWER UNIT
Filed July 21, 1950
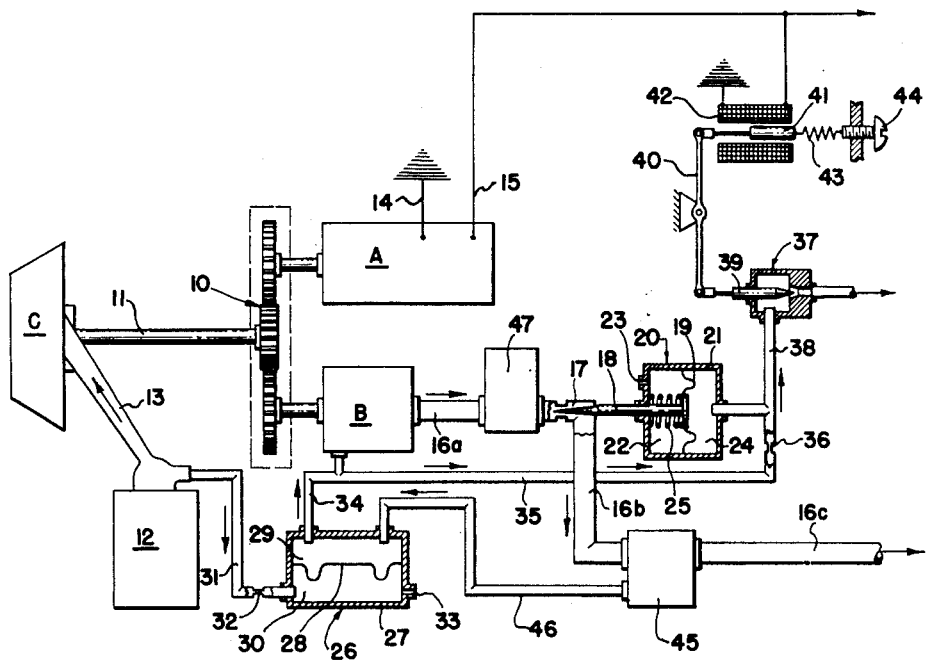
Elvin D. Lytle
*INVENTOR.*
BY
ATTORNEY

Patented Jan. 13, 1953

2,625,660

UNITED STATES PATENT OFFICE 2,625,660

ELECTRIC-HYDRAULIC POWER UNIT

Elvin D. Lytle, Los Angeles, Calif., assignor to The Garrett Corporation, Los Angeles, Calif., a corporation of California Application July 21, 1950, Serial No. 175,050

10 Claims. (Cl. 290—40)

1

The present invention relates generally to an electric-hydraulic power unit or package; and is more particularly concerned with novel means for regulating the voltage and frequency of the generated electrical output of such a power unit.

One object of the herein described invention is to provide a compact power unit or package of small size and relatively light weight for furnishing both an electric supply regulated as to voltage and frequency, and a fluid pressure supply regulated as to pressure.

A further object is to provide in a prime mover driven unit for supplying both an electric current and a fluid under pressure, novel means for regulating the voltage of the electric supply which requires a minimum of weight size and number of additional parts.

Another object is to provide voltage regulating means of such character that means driven by the generator prime mover may not only be utilized for supplying a fluid under pressure for a useful purpose, but also may be utilized as a variable loading device for regulating the prime mover speed and consequently the voltage and frequency of the generator output.

Still another object is to provide an arrangement in connection with an electric generator driven by a prime mover, wherein speed changes may be accomplished to vary the voltage and frequency of the generator output by variable loading means applied to the prime mover.

Further objects of the invention will be brought out in the following part of the specification, wherein detailed description is for the purpose of fully disclosing the invention without placing limitations thereon.

Referring to the accompanying drawing, the single figure schematically illustrates the component parts and their association into a power unit or package embodying the features of the present invention.

More specifically, the main elements of the electric-hydraulic power unit or package of the present invention comprise an electric generator A such as an alternator, and a fluid pump B arranged to be driven from a common prime mover C. In the present instance, the generator and fluid pump are connected through gearing 10 to a drive shaft 11 of the prime mover.

In the present instance, the prime mover is illustrated as being motivated from a pressure source 12 which is connected through a supply duct 13 to the prime mover. The construction of the prime mover and operating media furnished from the pressure source may assume a

2 variety of arrangements. For example, steam, heated air under pressure, or the products of combustion of a combustible fuel, or other suitable means may be utilized for motivation of the prime mover.

The output of the generator A, is illustrated as being delivered to a circuit which for simplicity has been illustrated as comprising a grounded conductor 14 and a conductor 15 which is carried to a point of use.

In a similar manner, the fluid pump B has its outlet connected to a distribution conduit 16a—16b—16c by which pump fluid under pressure is conducted to a point of use. The fluid pump B may be of a type utilized for pumping different types of fluids, and insofar as the operation of the voltage regulating means to be hereinafter described is concerned, the pump may be utilized with either compressible fluids such as an air or gas as well as substantially incompressible fluids such as oil, water or other liquid.

In its broad concept, the present invention proposes to regulate the output voltage and frequency of the generator A through the variation of the fluid pumping conditions imposed upon the fluid pump B, so that by increasing or decreasing the load effect of the fluid pump upon the prime mover, the driving speed of the prime mover and the generator A may be varied in such a manner as to maintain the generator voltage and frequency of the electrical output at a predetermined value.

For carrying out the invention, a flow regulating valve 17 is placed in the distribution conduit from the fluid pump B, this valve having an actuating stem 18 which is connected to a diaphragm 19 of a valve actuator generally indicated by the numeral 20. The diaphragm 19 is operatively supported in a housing and cooperates therewith to define a compartment 22 on one side having connection with an atmospheric vent 23, and a compartment 24 on the other side arranged to receive a fluid under pressure.

A calibrated expansion spring 25 in the compartment 22 is operatively associated with the diaphragm 19 so as to bias the same in a direction to move the valve 17 towards open position. Fluid pressure acting in the compartment 24 will act through the diaphragm to move it in a direction such that the valve 17 will be urged towards closed position against the action of spring 25. Thus, it will appear that by varying the pressure within the compartment 24, the opening and closing of the valve 17 may be readily controlled.

Closing of the valve 17 will cause the outlet pressure of the fluid pump B to be increased and consequently there will be an increase in back pressure on the fluid pump and an increase in its load which will cause the prime mover to tend to slow down. The opposite effect will result when the valve 17 is moved to further open position, in which case the back pressure will be decreased and as the pump load decreases, the prime mover will tend to speed up. These actions of the prime mover will, of course, be reflected in the output of the electric generator A, since voltage and frequency are directly effected by speed changes in the generator.

Any available source of pressure may be utilized for the actuation of actuator 20. For example, in some installations it may be found desirable to supply the fluid pressure to compartment 24 from the pressure source 12. On the other hand, the fluid from this source may not in a particular instance be practically adapted for the operation of the actuator 20. In such case, a reservoir 26 may be provided, this reservoir comprising a housing 27 which is provided with a movable partition 28 which separates the housing into a compartment 29 on one side for receiving a fluid supply for the fluid pump B, and a compartment 30 on the other side which is connected by a supply conduit 31 to the pressure source 12.

When the pressure source 12 provides a fluid medium of relatively high pressure, it may be desirable in such case to reduce this pressure for use in the compartment 30. This may be done by providing a calibrated restricted flow passage 32 in the supply conduit 31 and a calibrated vent outlet passage 33 from the compartment. The action of the pressure in the compartment 30 upon the partition 28 will act to compress and pressurize the pump supply fluid in the compartment 29, this compartment being connected through a conduit 34 in this case to the fluid pump inlet. This arrangement would, of course, be utilized with fluid pumps of the type wherein the pumping characteristics are such that they have desired operating advantages when fluid is supplied under pressure to the pump.

In the illustrated arrangement, the compartment 24 of the actuator 20 is connected by means of a branch conduit 35 with the fluid supply for the pump B, a restricted flow passage 36 being provided to reduce the fluid pressure applied to the compartment 24 and regulate it to a substantially predetermined definite value which will permit calibrating the spring 25 for giving the desired operation.

The fluid pressure within the compartment 24 is varied in accordance with a characteristic of the output of the electric generator A. In the illustrated embodiment of the invention, means are provided for varying the fluid pressure for operating the actuator 20 in response to voltage variations.

For such purpose, a metering or regulating valve 37 is provided in a bleed connection branch conduit 38 which is connected between the restricted flow passage 36 and the compartment 24. The valve 37 includes a valve member 39 which is operatively connected through an actuating linkage 40 with a plunger 41 of a solenoid having its coil 42 electrically connected with the output circuit of the generator A. The plunger 41 is biased by a spring 43 in a direction to cause the valve member 39 to move toward open position. Energization of the coil 42 causes upon increased voltage a movement of the plunger 41 in a direction which will oppose the action of spring 43 and tend to move the valve member 39 towards closed position. By means of an adjusting screw 44 or other suitable means, the interconnected solenoid and valve 37 may be critically adjusted to operate at desired value with respect to voltage changes.

In order that the pressure of the fluid delivered through the distribution conduit to point of use may be maintained at a desired pressure, a pressure relief valve 45 is provided in the distribution conduit, this valve having a return connection 46 with the compartment 29 of the reservoir 26.

The relief valve 45 should be of appropriate capacity to meet the hydraulic load variations, even though the hydraulic system is used to control the electrical output. In some instances, however, it may be found necessary due to response rate or pressure drop to utilize a small hydraulic accumulator as indicated by the numeral 47.

The operation of the voltage regulating means will now be described briefly. Assuming that the electric-hydraulic power unit is operating under normal conditions. Let it be assumed that there is a drop in electrical load, the prime mover immediately tends to increase its speed and as a consequence cause an increase in generator output voltage. This voltage increase acts upon the solenoid plunger 41 to move it in a direction to close the valve member 39 of the valve 37. This causes the fluid pressure in compartment 24 of the actuator 20 to rise, whereupon the regulating valve 17 will be motivated towards closed position, thereby increasing the fluid discharge head or back pressure upon the fluid pump B. The pump load on the prime mover is thus increased. This will reduce the turbine speed to that required to give the voltage for which the regulating means have been adjusted. Likewise, since the generator frequency is a function of speed, regulation of voltage will thus tend to retain the frequency within desired limits of variations.

From the foregoing description, it will be apparent that the present invention embodies a novel arrangement of elements into an electric-hydraulic power unit or package of small size and relatively light weight for furnishing both an electric supply regulated as to voltage and frequency, and a fluid pressure supply regulated as to pressure, the unit utilizing the fluid pump of the fluid pressure supply as means for varying the load imposed upon the prime mover driving the generator, whereby the generator voltage may be regulated to a desired value.

I claim:

1. An electric-hydraulic power unit, comprising: an electric generator having an outlet connection for delivering electricity to a point of use; a fluid pump having an outlet connection for delivering a fluid under pressure to a point of use; a prime mover connected to a fluid pressure source for driving said generator and pump; reservoir means pressurized from said fluid pressure source for supplying a fluid under pressure to said pump; a pressure relief valve connecting the outlet and fluid supply of said pump; a fluid pressure actuated regulating valve in said pump outlet upstream from said relief valve, said regulating valve having an operating pressure connection with the pump fluid supply; and means including a metering valve for regulating the pressure acting on said regulating valve; and electrical responsive means connected to said generator outlet for actuating said metering valve.

2. An electric-hydraulic power unit, comprising: an electric generator having an outlet connection for delivering electricity to a point of use; a fluid pump having an outlet connection for delivering a fluid under pressure to a point of use; a prime mover connected to a fluid pressure source for driving said generator and pump; a reservoir having a separating movable partition defining a compartment on one side for receiving a fluid supply for said pump, and a compartment on the other side for receiving fluid under pressure from said pressure source so as to pressurize the fluid for said pump; a fluid pressure actuated valve in said pump outlet having an operating connection with the fluid supply for said pump; and means connected to said generator outlet for controlling the pressure acting on said valve in accordance with variations in a characteristic of the generator output.

3. An electric-hydraulic power unit, comprising: a prime mover; an electric generator and a fluid pumping device driven by said prime mover; and means for varying the load effect upon said prime mover by said pumping means in response to variations in the output of said electric generator, including a pump controlling valve energized from said generator.

4. An electric-hydraulic power unit, comprising: a prime mover; an electric generator and a fluid pumping device driven by said prime mover; throttling means for varying the outlet flow from said fluid pumping device; and means responsive to voltage variations in the output of said generator for actuating said throttling means so as to vary its load effect on said prime mover.

5. Voltage regulating means for an electric generator driven by a prime mover, comprising: a fluid pumping element driven from said prime mover and having an outlet connection; a flow control valve in said connection, said valve being biased towards open position; fluid pressure actuated means having a connection with a fluid pressure source and operable to urge said valve towards closed position; and electrically actuated means connected to said electric generator operative to increase and decrease the pressure of fluid acting on said fluid pressure actuated means in accordance with generator voltage increase and decrease.

6. Voltage regulating means for an electric generator driven by a prime mover, comprising: fluid pumping means driven by said prime mover having a fluid pressure outlet delivery connection; means for varying the back pressure of fluid in said outlet to change the pumping means load and effect speed changes in said prime mover; and means for actuating the back pressure varying means in response to a characteristic of the output of said electric generator.

7. Voltage regulating means for an electric generator driven by a prime mover, comprising: fluid pumping means driven by said prime mover; a valve for regulating the outlet pressure of said fluid pumping means; a fluid pressure source; actuating means for said valve including a connection with said fluid pressure source; and means including a metering valve for varying the fluid pressure acting on said actuating means, said metering valve being responsive to voltage variations in the output of said electric generator.

8. Voltage regulating means for an electric generator driven by a prime mover, comprising: fluid pumping means driven by said prime mover having a fluid pressure outlet delivery connection; and electro-hydraulic means responsive to a characteristic of the output of said electric generator for controlling flow in said connection.

9. Voltage regulating means for an electric generator driven by a prime mover, comprising: pumping means driven by said prime mover having a fluid pressure outlet delivery connection; and electro-hydraulic means responsive to a characteristic of the generator output, said latter means including a valve operable to vary the pumping conditions of said fluid so as to change the pumping load on said prime mover.

10. An electric-hydraulic power unit, comprising: an electric generator having an outlet connection for delivering electricity to a point of use; a fluid pump having an outlet connection for delivering a fluid under pressure to a point of use; a prime mover for driving said generator and pump; a fluid pressure actuated valve in said pump outlet; and means connected to said generator outlet for controlling the pressure acting on said valve in accordance with variations in a characteristic of the generator output.

ELVIN D. LYTLE.

REFERENCES CITED

The following references are of record in the file of this patent:

UNITED STATES PATENTS

| Number | Name | Date |
|---|---|---|
| 1,709,871 | Parke | Apr. 25, 1929 |
| 1,711,641 | Hewitt | May 7, 1929 |
| 1,766,548 | Schnitzer | June 24, 1930 |
| 1,873,982 | Rusterholz | Aug. 30, 1932 |
| 2,246,516 | Herzog | June 24, 1941 |
| 2,258,462 | Martin | Oct. 7, 1941 |
| 2,302,042 | Martin | Nov. 7, 1942 |